US012627091B2

(12) United States Patent
Brenca et al.

(10) Patent No.: US 12,627,091 B2
(45) Date of Patent: May 12, 2026

(54) ELECTRICAL CONNECTION DEVICE

(71) Applicant: Tyco Electronics France SAS, Pontoise (FR)

(72) Inventors: Veronique Brenca, Pontoise (FR); Imad Smirani, Pontoise (FR); Xavier Rouillard, Pontoise (FR)

(73) Assignee: TE Connectivity Solutions GmbH, Schaffhausen (CH)

( * ) Notice: Subject to any disclaimer, the term of this patent is extended or adjusted under 35 U.S.C. 154(b) by 666 days.

(21) Appl. No.: 17/961,665

(22) Filed: Oct. 7, 2022

(65) Prior Publication Data

US 2023/0109845 A1 Apr. 13, 2023

(30) Foreign Application Priority Data

Oct. 7, 2021 (FR) ...................................... 2110654

(51) Int. Cl.
*H01R 13/506* (2006.01)
*H01R 13/434* (2006.01)

(52) U.S. Cl.
CPC ......... *H01R 13/434* (2013.01); *H01R 13/506* (2013.01)

(58) Field of Classification Search
None
See application file for complete search history.

(56) References Cited

U.S. PATENT DOCUMENTS 7,435,131 B1 * 10/2008 Lee ........................ H01R 12/79 439/495
8,840,415 B2 * 9/2014 Orris .................... H01R 13/025 439/495

(Continued)

FOREIGN PATENT DOCUMENTS

DE 102020212336 A1 * 4/2021 ......... H01R 12/7023
EP 0667651 B1 6/2000

(Continued)

OTHER PUBLICATIONS

Japanese Office Action dated Oct. 17, 2023 with English translation, corresponding to Application No. 2022-160122, 12 pages.

(Continued)

*Primary Examiner* — Felix O Figueroa
(74) *Attorney, Agent, or Firm* — Barley Snyder

(57) ABSTRACT

An electrical connection device includes a first jaw and a second jaw facing the first jaw in a closed state. The first jaw has a first insertion surface perpendicular to an insertion direction into a connection casing, a first surface facing the second jaw that is substantially parallel to the insertion direction, and an opposite first surface opposite the first insertion surface. The first jaw has a first recess. The second jaw has a second surface facing the first jaw and extending substantially parallel to the insertion direction, a second insertion surface introduced over the connection casing and perpendicular to the insertion direction, and an opposite second surface opposite to the second insertion surface. The second jaw has a second recess facing the first recess in the closed state. The first recess and/or the second recess has a rod at the first edge and/or the second edge.

17 Claims, 4 Drawing Sheets

(56) References Cited

U.S. PATENT DOCUMENTS

| | | | | |
|---|---|---|---|---|
| 9,905,978 | B2 * | 2/2018 | Zebhauser | H01R 4/183 |
| 9,948,035 | B2 * | 4/2018 | Toyama | H05K 1/181 |
| 11,205,881 | B2 * | 12/2021 | Makino | H01R 12/771 |
| 11,381,010 | B2 | 7/2022 | Brenca et al. | |
| 2024/0145954 | A1 * | 5/2024 | Phatiwuttipat | H01R 12/592 |

FOREIGN PATENT DOCUMENTS

| | | | |
|---|---|---|---|
| EP | 1311028 | A2 | 11/2002 |
| FR | 3105615 | A1 | 6/2021 |
| JP | 2008300129 | A | 12/2008 |
| JP | 2017004857 | A | 1/2017 |
| JP | 2020004503 | A | 1/2020 |
| WO | 2019188739 | A1 | 10/2019 |

OTHER PUBLICATIONS

Korean office Action dated Jul. 17, 2024 with English translation, corresponding to Application No. 10-2022-0128875, 9 pages.

* cited by examiner

ELECTRICAL CONNECTION DEVICE

CROSS-REFERENCE TO RELATED APPLICATIONS

This application claims the benefit of the filing date under 35 U.S.C. § 119(a)-(d) of French Patent Application No. 2110654, filed on Oct. 7, 2021.

FIELD OF THE INVENTION

The present invention relates to an electrical connection device and, more particularly, to an electrical connection device for a flat, flexible, electrically conductive element.

BACKGROUND

Flat, flexible, electrically conductive elements are known in the art and recognized for their interesting thermal properties, for example, in the field of vehicle heating. These elements can have electrically conductive paths in the form of surface-impregnated metal layers. In that respect, conductive graphite or carbon paths may be printed by screen printing on cotton textiles or synthetic fiber materials.

The conductive paths of said flat, flexible elements can emit, when powered, a heat which is quasi-instantaneous and independent of the state of a vehicle, in particular independent of the temperature of a cooling liquid of an engine. The emission of heat by ohmic heating related to the resistance of the conductive paths can, in particular, consume a power inferior to that necessary to operate, for example, a vehicle ventilation system. The flat, flexible electrically conductive elements can moreover be installed under various surfaces and evenly distribute a heat in accordance with surface geometry. Thanks to their varied flexibility and applicability, they can therefore be particularly advantageous. Thus, the use of such flat, flexible elements in the field of vehicle heating can be assimilable to a passenger comfort vector and vehicle energy efficiency.

The powering of flat, flexible electrically conductive elements can entail a particular difficulty linked to a structural fragility of the material of the flat, flexible element. Indeed, the fine and flexible nature of such elements can pose a risk of deformation and rupture under mechanical stress, for example under stress of pressure forces caused by metal, electrical connectors or contacts. These risks can be amplified in vehicle environments subjected, for example, to mechanical vibrations, accelerations and decelerations, or occasional impacts.

A first device for electrically connecting a textile to at least one electrical contact is disclosed in patent application FR3105615A1, enabling a solution with an opening for insertion of the textile and with said textile being extended along a body and folded around an end of said body. During its insertion in its corresponding casing, the friction of an electrical contact of the casing on the textile extended along the body. Furthermore, this device leads to an establishment of an electrical connection by the perpendicular pressure of said electrical contact on the electrically conductive textile against a bearing surface of the device. However, there is a need to further improve the long-term reliability of the electrical contact established with an electrically conductive textile.

SUMMARY

An electrical connection device includes a first jaw and a second jaw facing the first jaw in a closed state. The first jaw has a first insertion surface perpendicular to an insertion direction into a connection casing, a first surface facing the second jaw that is substantially parallel to the insertion direction, and an opposite first surface opposite the first insertion surface. The first jaw has a first recess. The second jaw has a second surface facing the first jaw and extending substantially parallel to the insertion direction, a second insertion surface introduced over the connection casing and perpendicular to the insertion direction, and an opposite second surface opposite to the second insertion surface. The second jaw has a second recess facing the first recess in the closed state. The first recess and/or the second recess has a rod at the first edge and/or the second edge.

BRIEF DESCRIPTION OF THE DRAWINGS

The invention will now be described by way of example with reference to the accompanying Figures, of which.

DETAILED DESCRIPTION OF THE EMBODIMENT(S)

Below, the same references in the figures are used to identify elements of the same nature. The figures are schematic representations with the aim to be legible, which can be not to scale. In particular, the dimensions of the elements represented in a Cartesian direction can be not to scale, neither relatively to one another, nor relatively to the dimensions of said elements in another Cartesian direction.

Figure 1:
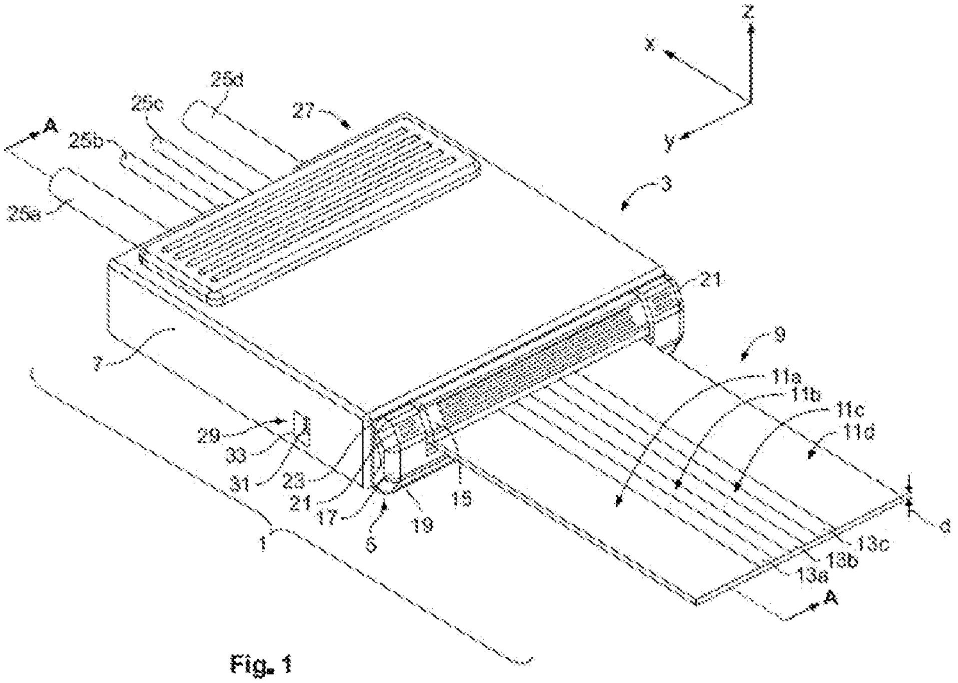
FIG. 1 is a perspective view of an electrical connection system according to an embodiment.

A perspective observation view of an assembly 1 of an electrical connection system 3 is represented in FIG. 1, the assembly 1 comprising an electrical connection device 5 and a connection casing 7, with a flat, flexible, electrically conductive element 9.

The assembly 1 represented is in a final electrical connection state in FIG. 1, also called an inserted state. The connection device 5 has been inserted through an opening 23 in the insertion direction x into the connection casing 7, in order to establish an electrical connection between the flat, flexible element 9 and contacts in the connection casing 7.

FIG. 1 illustrates that the flat, flexible element 9 is compressed between a first jaw 15 and a second jaw 17 of the electrical connection device 5 inserted in the casing 7.

The assembly 1 moreover has a wired connection of four electrical conductors 25*a*, 25*b*, 25*c*, 25*d* connected to the casing 7 through openings in the surface 27 opposite to the opening 23 of the casing 7. The electrical conductors 25*a*, 25*b*, 25*c*, 25*d* are conventional cables, for example, insulated copper or aluminum wires.

The flat, flexible, electrically conductive element 9 has a thickness d along the normal direction z perpendicular to the insertion direction x which is very thin, for example less than 1%, relative to all the other dimensions in the x-y plane of the flat, flexible element. The flat, flexible element 9 can, for example, be constituted of an organic or synthetic textile, or of a flexible plastic.

The flat, flexible element 9, as shown in FIG. 1, has four conductive paths 11*a*, 11*b*, 11*c*, 11*d*, inter-spaced by three non-conductive or insulating paths 13*a*, 13*b*, 13*c*. All the paths extend in the insertion direction x along the flat, flexible element 9 arranged in the x-y plane. The conductive paths 11*a*, 11*b*, 11*c*, 11*d*, can, for example, take the form of surface-impregnated metal layers, in particular by screen printing. The conductive material of the conductive paths 11*a*, 11*b*, 11*c*, 11*d* can be, for example, graphite, carbon, silver or tungsten. The non-conductive paths 13*a*, 13*b*,13*c* can correspond to surfaces of the flat, flexible element 9 not impregnated with conductive material, or also to surfaces of the flat, flexible element 9, impregnated with insulating material. It will be understood by a person skilled in the art that the number and the arrangement of the conductive paths 11*a*, 11*b*, 11*c*, 11*d* on the flat, flexible element 9 is not subject to any restriction and can differ from one application to another. Each of the conductive paths 11*a*, 11*b*, 11*c*, 11*d* is arranged on the flat, flexible element 9 on an axis in the insertion direction x that is identical to a connection axis of a respective conductor from among the four electrical conductors 25*a*, 25*b*, 25*c*, 25*d*.

The positioning of the device 5 in the casing 7 is ensured by a snap-fitting device 29 achieved by a projection 31 at the device 5 which enters into a through hole 33 in the casing 7 to thus achieve a connection by form-fitting, as shown in FIG. 1.

This embodiment of an assembly 1 according to the invention establishes an electrical connection between the conductive paths 11*a*, 11*b*, 11*c*, 11*d* of the flat, flexible element 9, for example an electrically conductive textile, and electrical conductors 25*a*, 25*b*, 25*c*, 25*d*, for example, wires. The implementation of this assembly 1 leads to an electrical connection solution for a flat, flexible, electrically conductive element 9, in particular an electrically conductive textile, more stable and less expensive than known in the art as explained in more detail below.

Figure 2A:
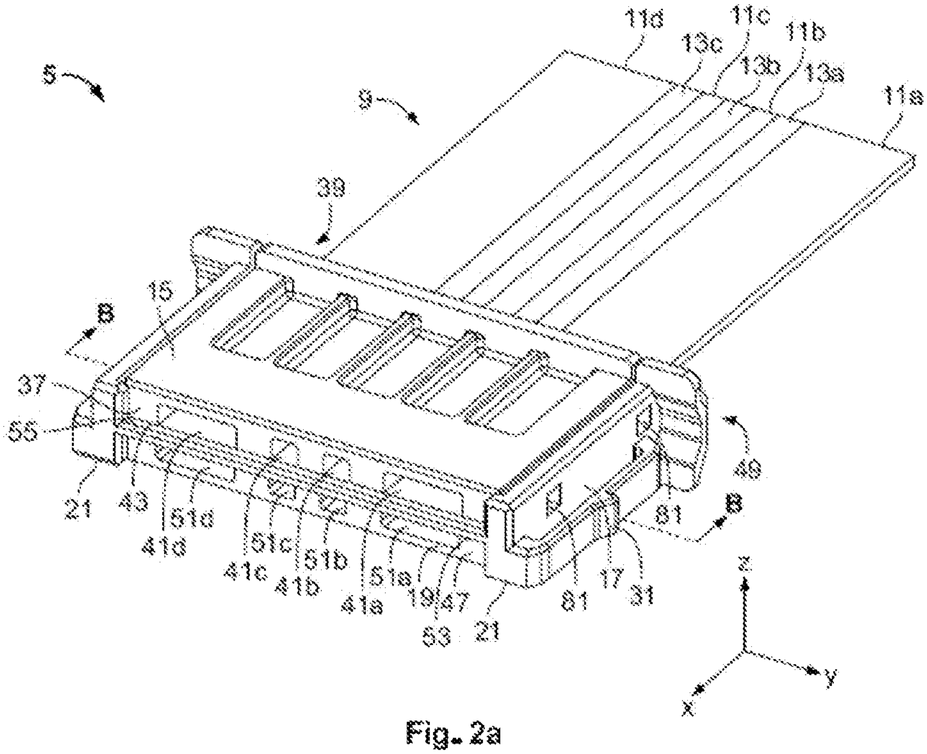
FIG. 2A is a perspective view of an electrical connection device in a closed state.
Figure 2B:
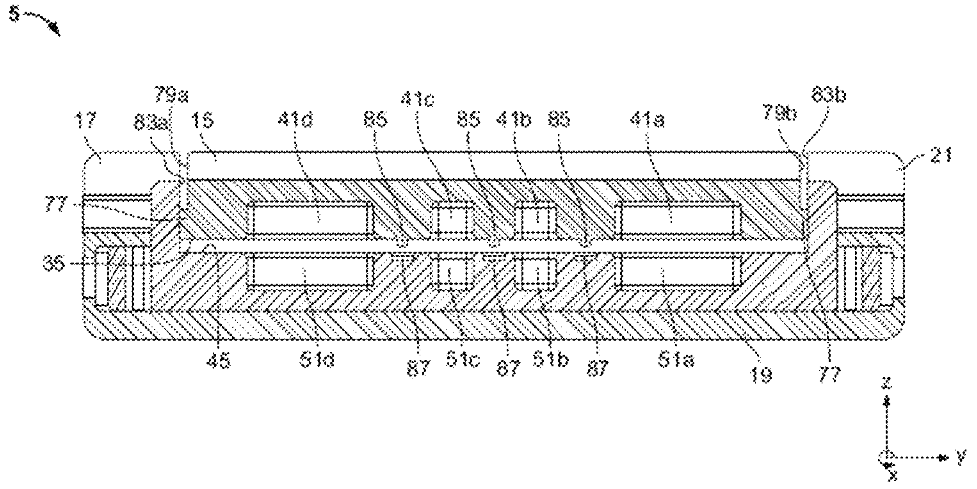
FIG. 2B is a sectional view of the electrical connection device, taken along axis B-B in FIG. 2A.
Figure 2C:
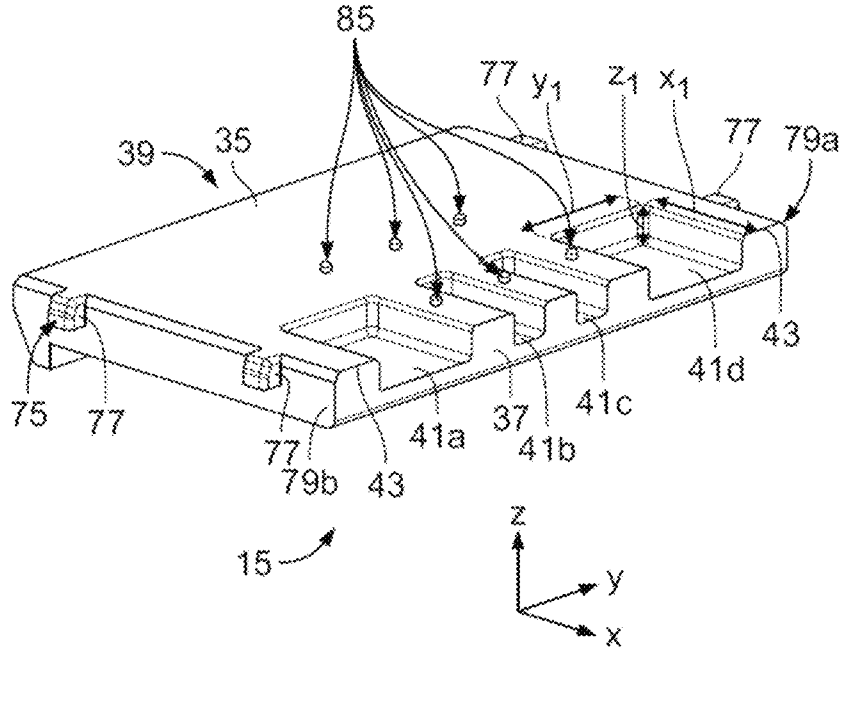
FIG. 2C is a perspective view of a jaw of the electrical connection device.
Figure 2D:
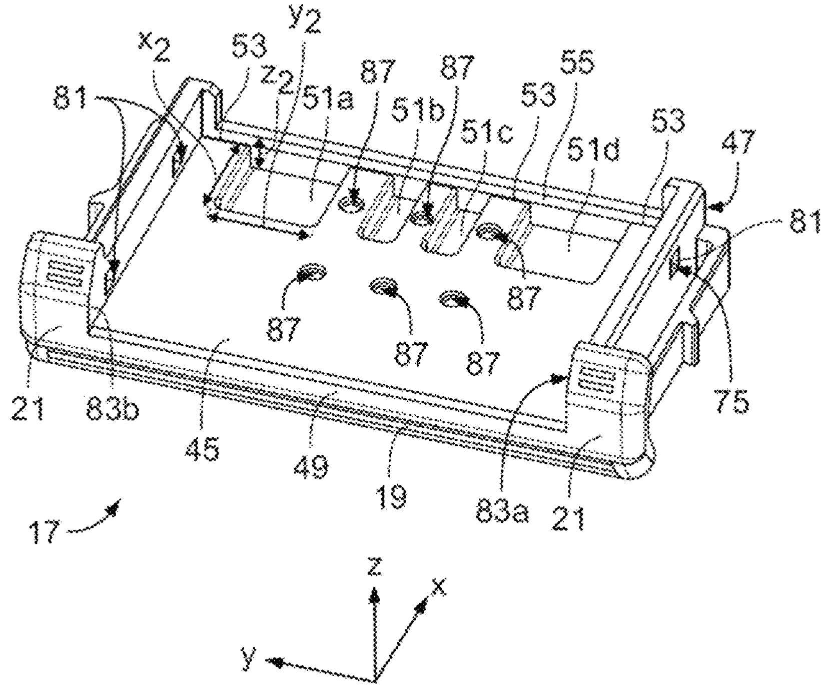
FIG. 2D is a perspective view of another jaw of the electrical connection device.

The electrical connection device 5 illustrated in FIG. 1 is described in more detail by referring to FIGS. 2A to 2D. FIG. 2A represents the connection device 5 of FIG. 1 exiting from the casing 5. Here, the connection device 5 with the first jaw 15 and the second jaw 17 is in a closed state. In the closed state, the first jaw 15 and the second jaw 17 face one another so as to compress the flat, flexible element 9 with the conductive paths 11*a* to 11*d* together. FIG. 2B is a cross-section along the axis B-B in the y-z plane such as illustrated in FIG. 2A. FIG. 2C shows a perspective view of the first jaw 15 and FIG. 2D shows a perspective view of the second jaw 17.

The first jaw 15 comprises a surface 35, which in the closed state of the jaws 15 and 17 illustrated in FIG. 2A, is facing the second jaw 17, and which is substantially parallel to the insertion direction x. The first jaw 15 also comprises an insertion surface 37 configured to be introduced into the casing 7. This insertion surface 37 is substantially perpendicular to the insertion direction x and extends in a plane parallel to the y-z plane. The first jaw 15 moreover has a surface 39 opposite the insertion surface 37, and side surfaces 79A, 79B, as shown in FIGS. 2B and 2C. The junction of the surface 35 facing the second jaw 17 in the x-y plane and of the insertion surface 37 in the y-z plane forms an edge 43 substantially parallel to the direction y.

The first jaw 15 comprises four rectangular recesses 41*a*, 41*b*, 41*c*, 41*d* which extend from said edge 43 partially to the opposite surface 39, and partially along the insertion surface 37. The recesses 41*a*, 41*b*, 41*c*, 41*d*, in an embodiment, have a depth x1 of 1 to 2 cm, a height z1 of 2 to 4 mm and a width y1 of 0.5 cm to 2 cm.

The first jaw 15 further comprises several, here six, protrusions 85 on the surface 35 facing the second jaw 17. In this embodiment, the protrusions 85 are arranged on the surface 35 three-by-three, on the one hand between the recesses 41*a*, 41*b*, 41*c*, 41*d*, and on the other hand towards the center of the surface 35. Other arrangement with more or less protrusions 85 are possible. The first jaw 15 comprises, in addition, projections 77, over each side surface 79*a*, 79*b*, here two.

FIG. 2D represents a perspective view of the second jaw 17. The second jaw 17 has, in cross-sectional view in a y-z plane, a U-shape with a base 19 and two lateral wings 21. The base 19 of the second jaw 17 forms a surface 45, which faces the first jaw 15 in the closed state of the jaws, such as illustrated in FIG. 1. The surface 45 is substantially parallel to the insertion direction x. The second jaw 17 also comprises an insertion surface 47 configured to be introduced into the casing 7 and which is substantially perpendicular to the insertion direction x. The second jaw 17 moreover has a surface opposite 49 the insertion surface 47, and side edges 83*a*, 83*b*. The junction of the surface 45 in the x-y plane and of the insertion surface 47 in the y-z plane forms an edge 53 substantially parallel to the direction y.

The second jaw 17 comprises four rectangular recesses 51*a*, 51*b*, 51*c*, 51*d*, shown in FIG. 2D, which extend from said edge 53 partially to the opposite surface 49, and partially along the insertion surface 47, with dimensions x2, y2 and z2, which may be similar to the dimensions x1, y1 and z1 of the recesses 41*a*, 41*b*, 41*c*, 41*d* of the first jaw 15.

In the closed state of the device 5, the recesses 51*a*, 51*b*, 51*c*, 51*d* are arranged facing the recesses 41*a*, 41*b*, 41*c*, 41*d* of the first jaw 15 such as illustrated in FIGS. 2A and 2B.

The second jaw 17 comprises depressions 87, here for example six, on the surface 45 facing the first jaw 15. The depressions 87 are, for example, arranged on the surface 45 three-by-three, on the one hand between the recesses 51*a*, 51*b*, 51*c*, 51*d*, and on the other hand in the center of the surface 45, such that their positions are complementary to the protrusions 85 of the first jaw 15, in particular in the closed state of the device 5. The depressions 87 are moreover wider in the x-y plane that the protrusions 85. This is shown in FIG. 2C. Other arrangements with more or less depressions are possible, provided that they are arranged in the same way as the protrusions 85.

The second jaw 17 has, on each side edge 83*a*, 83*b*, depressions 81, here two, each depression 81 forming a passage hole in the side edge 83*a*, 83*b*. The depressions 81 are arranged on the side edges 83*a*, 83*b*, so as to be complementary to the projections 77 of the first jaw 15. Thus, the projections 77 and the depressions 81 together form a snap-fitting device 75 between the first 15 and the second 17 jaw to ensure in a form-fitting way, the relative positioning of the two jaws 15 and 17 in the closed state, such as illustrated in FIGS. 2A and 2B. Thus, an involuntary disassembly of the two jaws 15 and 17 can be prevented. The flat element 9 positioned between the two jaws remains in place.

The projection 31, illustrated in FIG. 1 is arranged on an outer wall of each lateral wing 21 of the second jaw 17.

In this embodiment of the device 5 and according to the invention, the recesses 51*a*, 51*b*, 51*c*, 51*d* of the second jaw 17 comprise at their edge 53, formed by junction of the surface 45 facing the first jaw 15 in the x-y plane and of the insertion surface 47 in the y-z plane, a rod 55, as shown in FIG. 2D. In this embodiment, the rod 55 extends along the edge 53, over the whole width of the base 19 along the direction y perpendicular to the insertion direction x. At the part of the edge 53 comprised by the recesses 51*a*, 51*b*, 51*c*, 51*d*, the rod 55 passes through the recesses 51*a*, 51*b*, 51*c*, 51*d*.

The cross-section of the rod 55 has a substantially rectangular shape and two chamfers 57, arranged on the edge 59 of the rod 55 oriented in the insertion direction x, such as illustrated in FIG. 2A. The rod has a height z3 of, for example, 10% to 40% of the total height in the direction x of the base 19 of the second jaw 17. In the closed state of the two jaws 15, 17, the rod 55 goes beyond the insertion surfaces 37 and 47 in the insertion direction x.

In other variants of the device 5 of the invention, the number and the shape of the recesses 41*a*, 41*b*, 41*c*, 41*d*, 51*a*, 51*b*, 51*c*, 51*d* of the jaws 15, 17 can vary. Thus, other embodiments can have a greater or reduced number of recesses, which are, for example, hemispherical or rounded, rather than rectangular. The relative dimensions of the recesses can themselves also vary according to other embodiments of the device of the invention.

In other embodiments of the device of the invention, the rod 55 can be comprised by a recess 41*a*, 41*b*, 41*c*, 41*d* of the first jaw 15 at the edge 43, rather than by a recess 51*a*, 51*b*, 51*c*, 51*d* of the second jaw 17. It can thus, for example, extend along the edge 43 on the first jaw 15. As an alternative, it can also be comprised in a recess 51*a*, 51*b*, 51*c*, 51*d* such as described in reference to FIGS. 2A, 2B, 2C, 2D, and at the same time, by a recess 41*a*, 41*b*, 41*c*, 41*d* of the first jaw 15 at the edge 43. Such a configuration would lead to the two independent fragments of the rod 55 being joined together in the closed state of the device 5 to form a common rod 55.

The described device 5 performs a connector module function for a flat, flexible, electrically conductive element 9 configured to be inserted in a connection casing 7 for the establishment of a sustainable electrical connection. Thus, the device 5 has the function of fixing the flat, flexible element 9 in place between two jaws 15, 17 in view of said insertion. The quality of the fixing of the element 9 in the device 5 is directly related to the general strength of the electrical connection established following insertion in a connection casing 7.

This device 5 is a particularly stable connector module, in particular in the comparison with the state of the art, by virtue of the distribution of compression forces on either side of said element 9 and the advantageously increased compression surfaces. The increase of the compression surfaces enables to distribute the compression forces advantageously, and therefore to reduce the punctual forces. The device 5, in addition, does not require the folding of the flat, flexible, electrically conductive element 9 around a body such as previously known. This enables an immediate saving in material costs for the implementation of the device 5. The quantity of flat, flexible element material necessary for a connection can be decreased. Thus, further, the costs induced by the acquisition of conductive materials such as graphite can be reduced.

In the device 5 arranged such as described, thanks to the recesses 41*a*, 41*b*, 41*c*, 41*d*, 51*a*, 51*b*, 51*c*, 51*d* which face one another in the closed state, the flat, flexible element compressed between the jaws 15, 17 is doubly exposed inside each pair of recesses. This makes a double electrical contact possible on either side of the flat, flexible element 9 as described below. The rod 55, comprised in a recess 41*a*, 41*b*, 41*c*, 41*d*, 51*a*, 51*b*, 51*c*, 51*d* and arranged along an edge 43, 53, has a hardness greater than that of the flat, flexible element 9. It thus protects said element 9 during its insertion in the insertion direction x in the opening 23 of the casing 7. In particular, it protects the flat, flexible element 9 of a wrinkling or curving following an impact.

The snap-fitting device 75 comprising the projections 77 and the depressions 81 establishes a connection by mechanical form-fitting in the closed state of the device 5. Thus, a flat, flexible, electrically conductive element 9, such as an electrically conductive textile, can be immobilized stably and sustainably between the two jaws 15, 17 of the device. The complementary protrusions 85 and depressions 87 on the inner surfaces 35, 45 of the jaws 15, 17 establish pressure points on the flat, flexible element 9, which are added to the base compression of the jaws 15, 17 once the projections 77 are housed in the depressions 81. These pressure points temporarily increase the friction forces and prevent the flat, flexible element 9 compressed between the two jaws 15, 17 from being moved. The protrusions 85 and depressions 87 may be placed in the proximity of the recesses 41*a*, 41*b*, 41*c*, 41*d* and 51*a*, 51*b*, 51*c*, 51*d*, as it is at these recesses that the electrical connection of the flat, flexible element 9 is implemented.

Figure 3A:
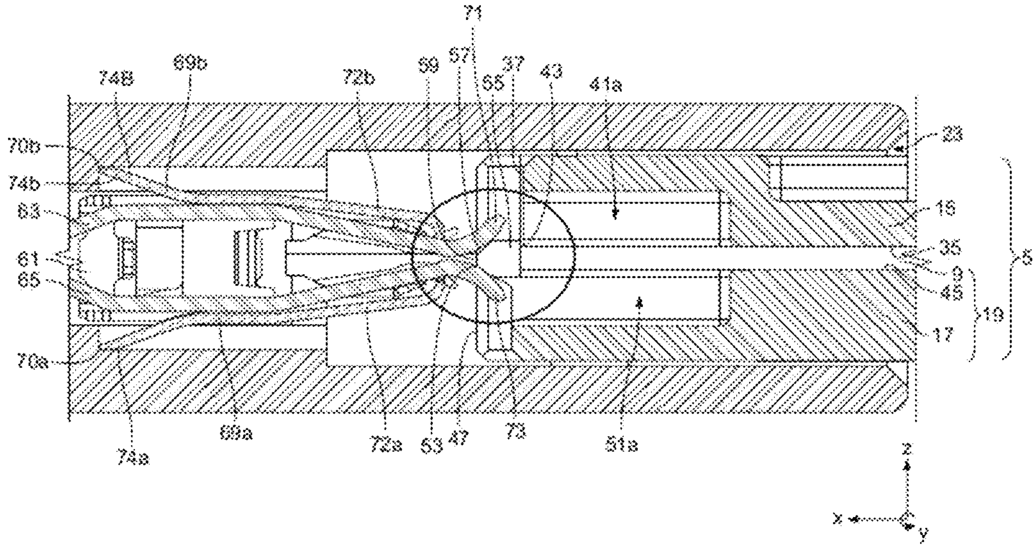
FIG. 3A is a sectional side view of the electrical connection system during assembly.
Figure 3B:
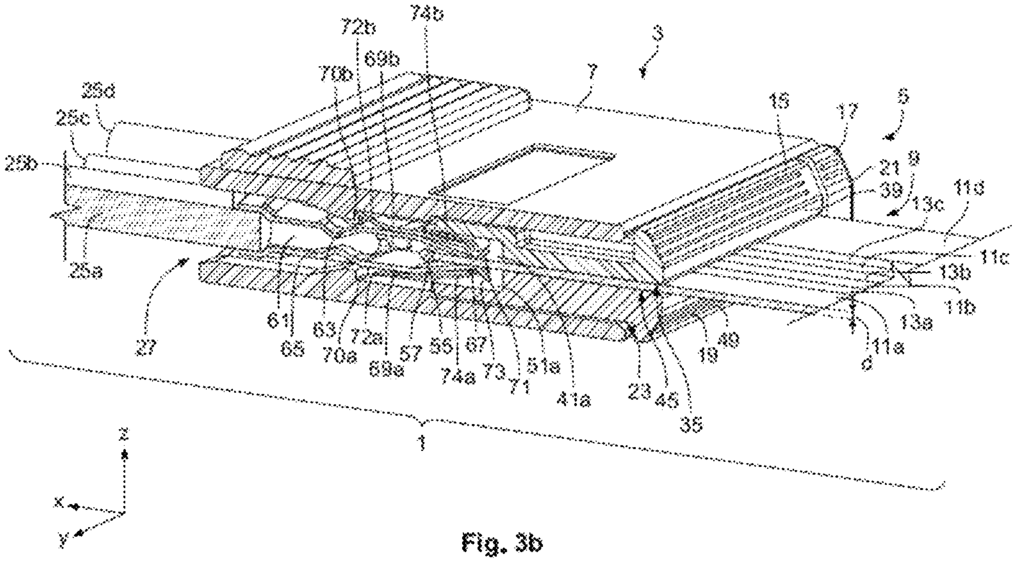
FIG. 3B is a sectional perspective view of the electrical connection system in a final state.

FIGS. 3A and 3B are cross-sectional views along the axis A-A of FIG. 1, of the same embodiment of an assembly according to the invention described in the part relating to FIG. 1. FIG. 3A is a cross-sectional view in the x-z plane of the assembly 1 during the assembly method according to the invention. The view is close to the interface of the electrical connection between the flat, flexible element 9 compressed in the connection device 5 and an electrical contact 61 in the connection casing 61. FIG. 3B is an oblique, cross-sectional view of the assembly 1 already assembled, i.e. in a completed assembly state. The assembly 1 of the connection system 3 comprises the connection device 5 for the flat, flexible element 9 illustrated in FIG. 2A to 2D and the connection casing 7, as well as the flat, flexible element 9.

Below, an embodiment of an assembly method according to the invention is described, in reference to FIGS. 3A and 3B. The method aims to assemble the electrical connection system 3 with the connection casing 7 and the connection device 5 with the flat, flexible, electrically conductive element 9.

The casing 7 has inside it, an electrical contact 61 comprising two branches 63, 65 forming a pincer 67, such as a timer-type electrical contact, for example a TYCO Junior Power Timer (JPT). The electrical contact 61 is connected to an electrical conductor 25 inserted through the face 27 opposite to the opening 23 of the casing 7, such as illustrated in FIG. 1. Each of the branches 63, 65 of the electrical contact 61 has an end 71, 73 with a substantially rounded extended rim.

The electrical contact 61 is, on each branch 63, 65, equipped with a leaf spring 69*a* and 69*b*. Each leaf spring 69*a* and 69*b* has an end 74*a*, 74*b* bearing against an inner edge 70*a* and 70*b* of the casing 7. Thus, a force can be exerted at the other end 72*a*, 72*b* of the springs 69*a* and 69*b*, at the pincer location 67 where the branches 63 or 65 pince together. Thus, by having two springs 69 opposite one another on the branches 63, 65, two forces F1 and F2 can be exerted at the pincer 67 in the opposite direction. Thus, the two branches 63, 65 press in the direction opposite one another, bestowing a pincer position 67 closed at rest, to the electrical contact 61.

After having, in a first step resulting in the illustration in FIG. 2A, compressed the flat, flexible element 9 between the first 15 and the second 17 jaw of the device 5 such that at least one edge of said element 9 is in contact with the rod 55, the device 5 is introduced into the casing 7. During this insertion, such as illustrated in FIG. 3A, the rod 55 upstream from the insertion surface 37 and 47 is first placed between the ends 71 and 73 which guide it to finally abut against the branches 63, 65 at the pincer 67. By pushing and thanks to the chamfers 57 arranged at the front on the rod 55, the branches 63 and 65 can be spaced apart against the forces F1 and F2 exerted by the springs 69*a* and 69*b*.

The extended and rounded edges of the ends 71, 73 enable a sliding in the direction z substantially normal to the insertion direction x of the edges of the ends 71, 73 on the rod 55. The chamfers 57 arranged on the rod 55 are used to reduce the sliding friction and therefore amplify the opening effect of the branches during the insertion of the device 5 in the casing 7. The chamfered rod 55 can dampen a mechanical impact on the rod 55 during the insertion of the device in the connection casing along the insertion direction x.

Once the branches 63 and 65 are sufficiently spaced apart, the rod 55 can pass behind the pincer 67 and enter further into the casing 7. This is illustrated in FIG. 3B. FIG. 3B shows that the branch 63 is at least partially inserted into the recess 41*a*, 41*b*, 41*c*, 41*d* of the first jaw 15 and the branch 65 is at least partially inserted into the recess 51*a*, 51*b*, 51*c*, 51*d* of the second jaw 17. In addition, thanks to the return forces exerted by the springs 69*a* and 69*b*, the pincer 67 is closed behind the rod 55.

Thus, in the inserted state of the assembly 1, the branches 63, 65 of the electrical contact 61 of the casing 7 bear on either side of the flat, flexible element 9 compressed in the device 5 to achieve a double electrical contact by the pincer 67.

The snap-fitting device 29 illustrated in FIG. 1 is triggered when the device 5 arrives in a final position in the casing 7, which enables the projection 31 of the second jaw 17 to be positioned in the through hole 33 of the casing 7. In this final position, the device 5 is thus maintained by snap-fitting to the casing 7.

Such as illustrated in FIG. 2A, the projection 31 is arranged with respect to the lateral wing 21 such that the projection 31 is flexible along the direction y. A disengagement of the device 5 outside of the casing 7, is made possible by a thrust on the projection 31 to the lateral wing 21 so as to disengage the projection 31 of the through hole 33 of the casing 7. Thus, an unlatching is possible. Furthermore, this enables to proceed with a snap-fitting and an unlatching reversibly, without plastically damaging or deforming the device 5, which can thus be advantageously reused.

By virtue of the double contact 69, the adherence of the electrical contact is greater by the doubling of the pressure points, and the electrical conductivity is improved by the doubling of electrical conduction surface. In particular, two points of double contact of opposite polarity can be established in two different places of a conductive path, thus obtaining the subsequent closing of an electrical circuit. This can enable the powering of the different conductive paths by one single device. This can also allow the distribution of the intensity of the current supplied to several locations of a flat, flexible electrically conductive element 9, thus increasing the total transmissible power in accordance with the thermal resistance at each location.

In addition, each of the branches 63, 65 of the pincer-forming electrical contact 61 being metal, the bearing force of the metal double contact is more homogenous and more precise than would be possible, for example, such as known in the state of the art. The solutions of the state of the art have a unilateral bearing force of a metal contact between a bearing surface, in particular made of plastic. Plastics can be deformable materials, or have non-homogeneities flatness, and therefore have non-homogenous supports for electrical contacts which degrade the quality of the contact. Moreover, the two branches 63, 65 of the electrical contact 61 have a degree of flexibility in the direction normal z to the insertion direction x. This enables to adapt the connection system 3 to different thicknesses d of the flat, flexible element 9, without exchanging or modifying components.

The method described enables to obtain a connection system assembly 1 which represents an electrical connection solution of a flat, flexible element which is more stable and less expensive than the known solutions of the prior art. In particular, this solution saves the necessary quantity of flexible element, such as the electrically conductive textile. This solution moreover reduces the frictions created on the flexible element during a connection insertion. The solution also improves the unilateral metal contact against a bearing surface by implementing a metal double contact on either side of the flexible element.

What is claimed is:

1. An electrical connection system, comprising:

a connection casing having an opening and an electrical contact arranged in the opening, the electrical contact having a pair of branches forming a pincer; and a device including:

a first jaw having a first insertion surface introduced into the connection casing, the first insertion surface is substantially perpendicular to an insertion direction in which the electrical connection device is inserted into the connection casing; and a second jaw facing the first jaw in a closed state, the first jaw has a first surface facing the second jaw that is substantially parallel to the insertion direction and an opposite first surface opposite the first insertion surface, the first jaw has a first recess extending from a first edge formed by a junction between the first surface facing the second jaw and the first insertion surface at least partially into the first surface and toward the opposite first surface, the second jaw has a second surface facing the first jaw and extending substantially parallel to the insertion direction, a second insertion surface introduced over the connection casing and perpendicular to the insertion direction, and an opposite second surface opposite to the second insertion surface, the second jaw has a second recess extending from a second edge formed by a junction between the second surface facing the first jaw and the second insertion surface at least partially into the second surface and toward the opposite second surface, the first recess faces the second recess in the closed state, the first recess and/or the second recess has a rod at the first edge and/or the second edge; and a flat, flexible, electrically conductive element compressed between the first jaw and the second jaw, the device is introduced into the connection casing such that the branches press on either side of the flat, flexible, electrically conductive element, a pair of ends of the branches are arranged behind the rod in the insertion direction.

2. An electrical connection device, comprising:

a first jaw having a first insertion surface introduced into a connection casing, the first insertion surface is substantially perpendicular to an insertion direction in which the electrical connection device is inserted into the connection casing; and a second jaw facing the first jaw in a closed state, the first jaw has a first surface facing the second jaw that is substantially parallel to the insertion direction and an opposite first surface opposite the first insertion surface, the first jaw has a first recess extending from a first edge formed by a junction between the first surface facing the second jaw and the first insertion surface at least partially into the first surface and toward the opposite first surface, the second jaw has a second surface facing the first jaw and extending substantially parallel to the insertion direction, a second insertion surface introduced over the connection casing and perpendicular to the insertion direction, and an opposite second surface opposite to the second insertion surface, the second jaw has a second recess extending from a second edge formed by a junction between the second surface facing the first jaw and the second insertion surface at least partially into the second surface and toward the opposite second surface, the first recess faces the second recess in the closed state, the first recess and/or the second recess has a rod at the first edge and/or the second edge, the first recess and the second recess are positioned on opposite sides of the rod in the closed state of the first jaw and the second jaw.

3. The electrical connection device of claim 2, wherein the first jaw has an additional first recess and the second jaw has an additional second recess, the additional first recess faces the additional second recess in the closed state.

4. The electrical connection device of claim 2, wherein the first jaw or the second jaw has a protrusion on the first surface facing the second jaw or the second surface facing the first jaw and the other of the first jaw or the second jaw has a depression complementary to the protrusion on the first surface or the second surface.

5. The electrical connection device of claim 2, wherein the rod has a chamfer at an edge of the rod that is oriented in the insertion direction.

6. The electrical connection device of claim 2, further comprising a coupling device compressing a flat, flexible, electrically conductive element between the first jaw and the second jaw.

7. The electrical connection device of claim 6, wherein the flat, flexible, electrically conductive element is an electrically conductive textile.

8. The electrical connection device of claim 6, wherein the coupling device has a snap-fitting device between the first jaw and the second jaw.

9. The electrical connection device of claim 8, wherein the snap-fitting device has a projection on a side surface of the first jaw or the second jaw and a depression complementary to the projection on a side edge of the other of the first jaw or the second jaw.

10. An electrical connection system, comprising:

a connection casing having an opening and an electrical contact arranged in the opening, the electrical contact having a pair of branches forming a pincer; and a device including:

a first jaw having a first insertion surface introduced into the connection casing, the first insertion surface is substantially perpendicular to an insertion direction in which the electrical connection device is inserted into the connection casing; and a second jaw facing the first jaw in a closed state, the first jaw has a first surface facing the second jaw that is substantially parallel to the insertion direction and an opposite first surface opposite the first insertion surface, the first jaw has a first recess extending from a first edge formed by a junction between the first surface facing the second jaw and the first insertion surface at least partially into the first surface and toward the opposite first surface, the second jaw has a second surface facing the first jaw and extending substantially parallel to the insertion direction, a second insertion surface introduced over the connection casing and perpendicular to the insertion direction, and an opposite second surface opposite to the second insertion surface, the second jaw has a second recess extending from a second edge formed by a junction between the second surface facing the first jaw and the second insertion surface at least partially into the second surface and toward the opposite second surface, the first recess faces the second recess in the closed state, the first recess and/or the second recess has a rod at the first edge and/or the second edge, the branches are inserted on either side of the rod in the first recess and the second recess during insertion of the device in the connection casing in the insertion direction through the opening.

11. The electrical connection system of claim 10, further comprising a coupling device coupling the connection casing with the device, the coupling device has a snap-fitting device between the device and the connection casing.

12. The electrical connection system of claim 11, wherein the snap-fitting device has a projection and a hole complementary to the projection.

13. The electrical connection system of claim 10, wherein each of the branches has an end opposite the insertion direction with a substantially rounded extended rim.

14. The electrical connection system of claim 10, wherein the electrical contact has a spring closing the branches of the contact at rest.

15. The electrical connection system of claim 10, further comprising a flat, flexible, electrically conductive element compressed between the first jaw and the second jaw.

16. The electrical connection system of claim 15, wherein the device is introduced into the connection casing such that the branches press on either side of the flat, flexible, electrically conductive element.

17. The electrical connection system of claim 16, wherein a pair of ends of the branches are arranged behind the rod in the insertion direction.

* * * * *